SIGNAL OPERATED AUTOMATIC CONTROL CIRCUIT
FOR COLOR TELEVISION RECEIVERS

Filed Aug. 10, 1951

INVENTOR
Eugene O. Keizer
BY
ATTORNEY

United States Patent Office 2,790,846

Patented Apr. 30, 1957

2,790,846

SIGNAL OPERATED AUTOMATIC CONTROL CIRCUIT FOR COLOR TELEVISION RECEIVERS

Eugene O. Keizer, Princeton, N. J., assignor to Radio Corporation of America, a corporation of Delaware Application August 10, 1951, Serial No. 241,291

The terminal fifteen years of the term of the patent to be granted has been disclaimed 4 Claims. (Cl. 178—5.4)

The present invention relates to circuits for automatic switching between two modes of operation, and more particularly, but not necessarily exclusively, it relates to means for automatically turning on and off the color control circuits of television apparatus upon the arrival of incoming color or black and white television signals.

In color television it is important that there be complete cooperation between the transmitter and receiver. For successful operation it is necessary not only to maintain accurate deflection scanning, but it is also necessary to maintain accurate synchronism in the timing of component color selection. In one method of color television, color images may be transferred electrically by analyzing the light from an object into not only its image elements as is accomplished by normal scanning procedure, but by also analyzing the light from elemental areas of objects or images into selected primary or component colors and deriving therefrom a signal representative of each of the selective component colors. A color image may then be reproduced at a remote point by appropriate reconstruction from a component color signal sequence. A reproduction of the proper color in the receiver is dependent upon accurate timing of the color selection in the receiver. This selection may be accomplished by a comparison of a fixed local oscillator signal wave with a signal of the same basic frequency which is phase modulated at the color transmitter in accordance with the color content of the elemental area being scanned.

Therefore, it is obvious that the color oscillator must be synchronized very accurately at the same frequency and phase as the basic frequency of the transmitted phase modulated wave. In one method of operation synchronism is accomplished by the periodic transmission of a 3.58 megacycle "burst" of signal wave equal to the frequency of the basic frequency of the phase modulated wave carrying the color information. A good description of the employment of the "burst" for color synchronization may be found in an article entitled "Recent developments in color synchronization in RCA color television system" published February 1950 by the Radio Corporation of America.

In order that receiving apparatus designed for the color television system will also serve to successfully reproduce high quality black and white pictures when receiving ordinary black and white television signals, the color television system may be arranged in such a manner as to arrest or stop this color sampling process in the television receiver when ordinary black and white television signals are being received. In order to accomplish this result and to automatically switch the receiver for both color and black and white operation, it is desirable to turn off the local color comparison oscillator or to otherwise switch the color control channel circuit components in the absence of color phasing signals. Therefore, in a system using a "burst" for synchronizing the local receiver color control oscillator it is desirable to automatically turn off the color control channel when a signal is being received which does not contain a color "burst" or other color identification wave form.

In the earlier automatic sampling control circuits, the sampling frequency oscillator itself was stopped either by loading or biasing. In later circuits, the amplifier or amplifiers following the oscillator were biased negatively to eliminate sampling. One of the difficulties, however, was that on weak black and white signals there was sufficiently high frequency noise to prevent complete cutoff of sampling. If the bias voltages were adjusted to cutoff completely on such black and white signals, then during color signal reception the amplitude of the oscillator signal delivered by the controlled amplifier or amplifiers was insufficient for sampling purposes.

The present invention is directed to an improved and simplified system of automatically controlling the operation of a color channel in accordance with an incoming signal.

Another object of this invention is to permit more positive switching from black and white operation to color operation, and vice versa.

A still further object of this invention is to provide an improved immunity of the switching function to noise present in the incoming signal.

According to this invention when a color television signal is being received, the "burst" is separated from the video signal by gating the video signal with a synchronizing pulse. The gated "burst" is then applied to a rectifier. The rectified burst is then applied to the grid of a control tube. The output of the control tube is used to bias an amplifier for the local oscillator frequency beyond cutoff, and positive feedback is employed between the amplifier and the control tube to secure a "trigger" or "snap" action such that the color sampling is either fully on or completely off.

Other and incidental objects of the invention will become apparent upon a reading of the full specification and an inspection of the accompanying drawing in which.

Figure 1:
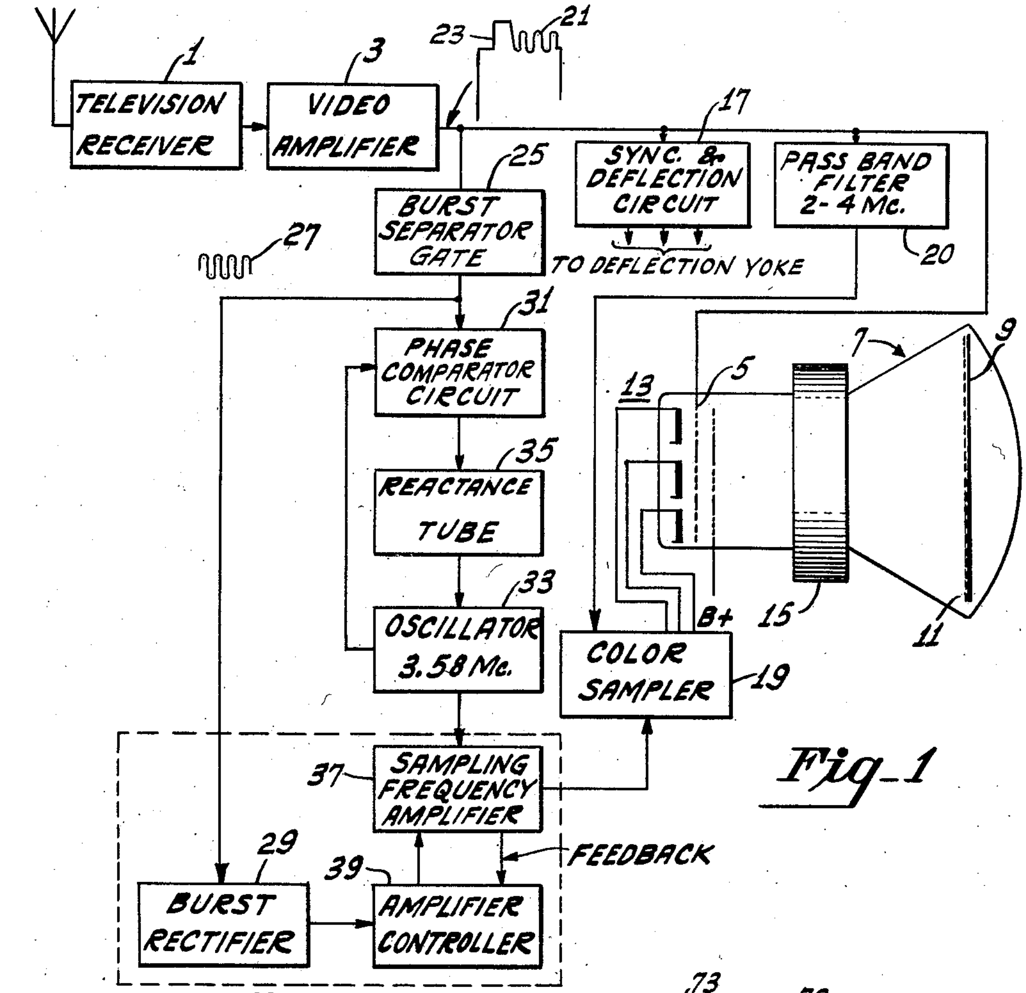
Figure 1 is a block representation of one form of the present invention as applied, for example, to a color television receiver.

Turning now in more detail to Figure 1 of the drawing, there is provided a color television receiver 1 which includes the applicable circuits for developing video signals. Suitable color television receivers may be found well shown and described in the publication entitled, "General Description of Receivers of the RCA Color Television System Which Employs the RCA Direct View Tri-Color Kinescope" dated April 1950 and published by the Radio Corporation of America.

The video signals obtained from a color television receiver 1 are applied to a video amplifier 3. The output of this video amplifier is applied to the control electrode 5 of a color image reproducing device 7. It is not the intention herein to limit the practice of the present invention to any single type of color image reproducing device. Any number of devices may be employed, such as, for example, a color kinescope of the type disclosed in United States patent to Alfred C. Schroeder, Number 2,595,548, issued May 6, 1952, and entitled "Picture Reproducing Apparatus." The color kinescope composed by Mr. Alfed C. Schroeder includes a luminescent screen 9 formed of a multiplicity of small phosphor dots of subelemetnal dimensions and arranged in groups to be capable of producing the selected component colors when excited by a particular color designating electron beam from gun structure 13. The color kinescope is also provided with an aperture masking electrode 11 located between luminescent screen 9 and the gun structure 13. The apertures of electrode 11 are positioned between the particular component color dot on the phosphor screen 9 and the appropriate color designating gun of the gun structure 13. Each of the guns of the gun structure will therefore produce only one of a plurality of color images on the phosphor screen 9. A suitable deflection yoke 15, or other deflecting means, is provided for scanning.

Appropriate scanning deflection energy for deflection coil 15 is supplied by the synchronization and deflection circuits 17 which may take any of the well known forms employed in the television art.

To reproduce a designated color in tube 7, it is necessary to appropriately bias the cathode of the gun structure 13 in order to cause an electron beam to excite the designated color phosphor on screen 9. For the purpose of explanation of the operation of this invention let us assume that a color sampler 19 is arranged to impress upon the cathodes of the gun structure 13 electrical signals representative of the color of the image to be reproduced. This color sampler 19 may consist of a phase amplitude detector such as is shown and described in detail in the co-pending patent application of George C. Sziklai and Alfred C. Schroeder, Serial Number 169,594, filed June 22, 1950.

The video output of video amplifier 3 is also applied to a pass band filter 20 which allows the portion of the video signal containing the color information to be applied to the color sampler 19. This band is shown to be two to four megacycles, since in this system of color television a phase modulated 3.58 megacycle signal subcarrier is transmitted along with the ordinary picture information to provide a means for supplying the color information. The output of the pass band filter 20 is applied to the color sampler 19 wherein the signal containing the color information is compared to the local oscillator reference frequency to detect or demodulate the color information.

In accordance with the phase detector or color sampler illustrated in the application of George C. Sziklai and Alfred C. Schroeder referred to immediately above, three separate phase indicating potentials are developed. Such phase indicating potentials are representative of the phase difference between the burst and a different one of three datum signals which have relative phase displacement with respect to one another of 120°. The phase indicating potentials are then applied respectively to the cathodes of the different electron guns of the gun structure 13. It is of course essential to the proper operation of the color sampler 19, regardless of the form it might take, that it be furnished a control signal constant in phase and frequency to enable its appropriate color separation.

In order to appropriately time the color selection in the receiver when color television signals are transmitted, a color synchronizing burst 21 is transmitted immediately following the conventional horizontal deflection scanning synchronizing pulse 23. The position of this synchronizing burst is commonly referred to among those skilled in the television art as occuring on the "back porch" of the deflection scanning synchronizing pulse. This is shown in the waveform illustrated at the output of the video amplifier 3.

The video signal from the video amplifier 3 is also applied to a burst separator gate 25. The burst separator gate is supplied with a synchronizing pulse from the synchronizing and deflection circuits 17, which is used to gate the burst separator 25. The separated burst 27 coming from the burst separator gate 25 is applied to a burst rectifier 29 which transforms the burst into a D. C. voltage. The burst coming from burst separator gate 25 is also applied to a phase comparator circuit 31 which compares the burst frequency with the phase of the output of the local receiver oscillator 33. The output voltage of the phase comparator circuit is a function of the difference between the burst phase and the local oscillator phase and is applied to a reactance tube 35 which controls the frequency and hence phase of the local oscillator 33. The output of the local oscillator 33 is connected back to the phase comparator circuit 31 in such a manner as to allow the phase comparator circuit 31 and the reactance tube 35 to synchronize the local oscillator frequency and phase with the burst frequency. Circuits of this type are well known in the television art. The synchronizing oscillator frequency, known as the sampling frequency, is then applied to the sampling frequency amplifier 37. The output of the sampling frequency amplifier is applied to the color sampler 19 which controls the operation of the gun structure 13. The rectified burst voltage from the burst rectifier 29 is connected to the amplifier controller 39 whose function is to control the operation of the sampling frequency amplifier 37 so that when there is a rectified burst voltage applied to the amplifier controller 39 the sampling frequency amplifier 37 will be allowed to conduct and amplify the oscillator frequency. In the present invention a connection is made from the sampling frequency amplifier 37 back to the amplifier controller 39 so that positive feedback is applied from the output of the sampling frequency amplifier 37 to the amplifier controller 39.

Figure 2:
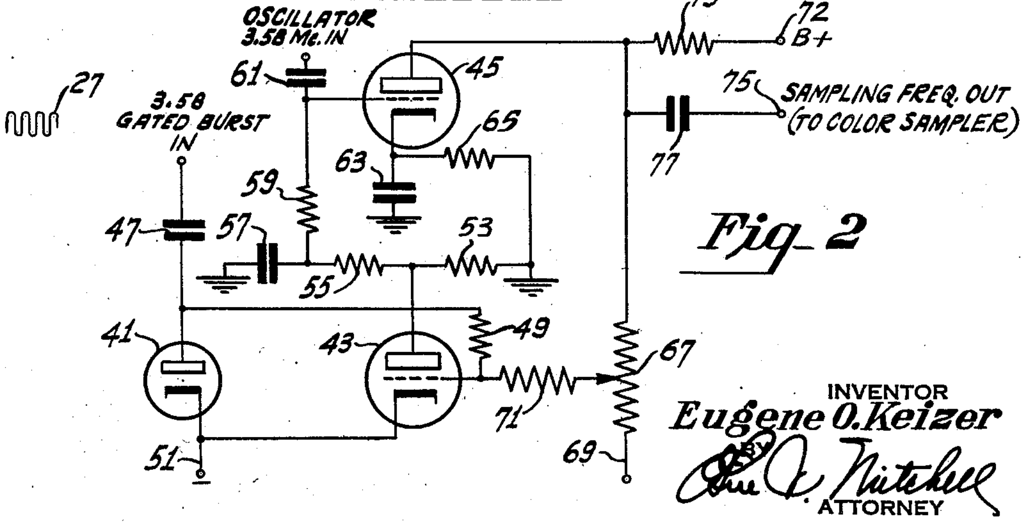
Figure 2 is a schematic representation of a form of the present invention as applied to a color television receiver.

Figure 2 is a more specific illustration of the present invention shown by means of a schematic circuit diagram. Figure 2 comprises the portion of Figure 1 which is included within the dashed rectangle. It will be noted that the circuit connections have been brought out on the same sides of Figure 2 as were shown by the diagrammatic connections to the dashed rectangle of Figure 1. Thus it is shown that the 3.58 megacycle gated burst is connected to the top left of Figure 2 from the burst separator gate, and the 3.58 megacycle local receiver oscillator is connected to the circuit at the top of Figure 2. The output of the circuit shown in Figure 2 is shown at the right hand side of Figure 2 and goes to the color sampler of Figure 1. Other connections to Figure 2 are the supply voltages used for operation in this embodiment.

Included in the circuit of Figure 2 are three electron tubes, the burst rectifier electron tube 41, the amplifier controller electron tube 43, and the sampling frequency amplifier electron tube 45.

The 3.58 megacycle gated burst 27 is connected through a capacitance 47 to the plate of the burst rectifier electron tube 41. The plate is also connected through a resistor 49 to the grid of the amplifier controller electron tube 43. The cathode of the burst rectifier electron tube 41 and the cathode of the amplifier controller electron tube 43 are connected together and to a supply of negative potential 51. The plate of the control electron tube 43 is connected through an impedance network to the grid of the sampling frequency amplifier electron tube 45. This impedance network comprises a resistance 53 connected from the plate of electron tube 43 to ground, and a resistance 55 also connected to the plate of electron tube 43, and to a capacitance 57, and to another resistance 59. The other connection to the capacitance 57 is made to ground potential. The other end of resistance 59 is connected to the grid of the sampling frequency amplifier electron tube 45. The 3.58 megacycle local oscillator is also connected through a capacitance 61 to the grid of the sampling frequency amplifier electron tube 45. The cathode of electron tube 45 is connected to ground potential through an impedance network consisting of a capacitance 63 and a resistance 65 connected in parallel. The plate of the sampling frequency amplifier electron tube 45 is connected to one end of the fixed resistance of a potentiometer 67. The other end of the fixed resistance of the potentiometer 67 is connected to a source of potential 69. The movable contact of the potentiometer 67 is connected through a resistance 71 to the grid of the amplifier controller electron tube 43. The plate of the sampling frequency amplifier electron tube 45 is also connected to a source of potential 72 through a resistance 73. The output of the circuit of Figure 2 is brought out to terminal 75 through a capacitance 77 from the plate of the sampling frequency amplifier electron tube 45.

The over all action of the circuit of Figure 2 is as follows; when the color television receiver is receiving signal with no burst of the sampling frequency and thus no gated burst is applied to the circuit of Figure 2, the amount of signal applied through capacitance 47 to the plate of the burst rectifier electron tube 41 will be small, resulting in a small negative potential between the cathode and plate of rectifier tube 41. If the movable contact on potentiometer 67 is positive with respect to the potential applied at 51, the negative voltage developed by the rectifier tube 41 will not begin to bias the control grid of electron tube 43 until a definite threshold has been reached depending upon the ratios of the resistances 49 and 71, and the voltage at the movable contact of the potentiometer 67. In this condition, i. e., below the threshold level, conduction will occur in electron tube 43 and the plate current of electron tube 43 will develop a negative voltage with respect to ground across the resistance 53. This negative voltage is applied through resistances 55 and 59 to the grid of the sampling frequency amplifier electron tube 45 biasing that amplifier to or beyond cutoff. Then there is little or no output of sampling frequency, no current through resistance 73, and the top end of the potentiometer 67 is at the same potential as the positive voltage applied at terminal 72, keeping the movable contact of potentiometer 67 positive with respect to the negative potential applied to terminal 51.

When a color signal with burst sampling frequency is being received, the gated amplified burst is applied through capacitance 47, and is rectified by the burst rectifier tube 41. When the potentiometer 67 is properly set, the negative voltage from the plate of the burst rectifier tube 41 will be sufficient to cause the control grid of the amplifier control tube 43 to go somewhat negative. This reduces the current through resistance 53 which allows the plate of the electron tube 43 to become more positive and therefore reduces the bias on the sampling frequency amplifier tube 45. When the bias on the control grid of the electron tube 45 becomes less than cutoff and allows the tube to conduct, the resulting current through resistance 73 causes the voltage at the movable contact of the potentiometer 67 to become less positive. This causes the control grid of the amplifier control tube 43 to become more negative, the bias across resistance 53 to become less, the plate voltage of electron tube 43 to become more positive, and the sampling frequency amplifier tube 45 to conduct more. With proper circuit values the process once started continues until the amplifier control tube 43 is completely cutoff and full amplification of the sampling frequency amplifier tube 45 results.

When the amplitude of the gated burst input falls below the new threshold level, the reverse process occurs until the sampling frequency amplifier tube 45 is cutoff. The value of the resistances 49 and 71 determine the difference in level between the two thresholds, which difference can be made quite small if desired. The time constant of resistance 55 and capacitance 57 is chosen to be quite long so that short peaks of noise do not effect the sampling frequency amplifier tube 45 bias.

Of course, it is clear that the operation of the present invention need not be restricted to any particular or single embodiment. For example, the voltage appearing across capacitance 57 might be applied to not only the sampling frequency amplifier but also following amplifiers might be controlled. The invention will undoubtedly find use in many circuits where a fast acting, positive control is necessary.

What is claimed is:

1. In a television receiver adapted to provide one condition of operation in response to a television signal containing an indicating signal and a second condition of operation in the absence of said indicating signal, the combination of, means separating said indicating signal from said television signal, means rectifying said indicating signal, an electron tube having at least a cathode, anode, and control electrode, a control tube having at least a cathode, anode, and control electrode, means coupling said rectifying means to the control electrode of said control tube, means coupling the anode of said control tube to the control electrode of said electron tube whereby said control electrode of said electron tube is biased positively in the presence of an indicating signal, and a direct current positive feedback connection between the anode of said electon tube and the control electrode of said control tube.

2. In a television receiver capable of receiving and transducing monochrome type television signals into monochrome television images or standard color television type signals into color television images, said color television signals including a periodic color synchronizing burst component, the combination of: a terminal means for accepting television signals of either type described; a direct current signal responsive means included in said receiver for selectively conditioning said receiver for optimum reception of a particular one of said types of television signal, said signal responsive means including a first amplifier having direct current signal response and provided with an input circuit and an output circuit; color burst separating means electrically coupled with said terminal means for separating said burst component from standard color television signals during their reception; rectifying means electrically coupled with said burst separating means for developing a direct current control voltage the amplitude of which is a direct function of the amplitude of said separated burst component; a second amplifier having direct current signal response for controlling said conditioning means and having an input circuit and an output circuit; direct current signal coupling means connected between said rectifying means and said second amplifier input circuit for applying said control signal thereto; a direct current signal coupling means connected between said second amplifier output circuit and said first amplifier input circuit; and a direct current signal coupling means connected between the output circuit of said first amplifier and the input circuit of said second amplifier such to establish a degree of positive feedback between said first and second amplifiers whereby to minimize the period required to change the conditioning of said receiver.

3. In a television receiver capable of receiving and transducing monochrome type television signals into monochrome television images or standard color television type signals into color television images, said color television signals including a periodic color synchronizing burst component, the combination of: a terminal means for accepting television signals of either type described; a first signal processing channel means coupled with said terminal means for transducing both color type and monochrome type television signals; a second signal processing channel means coupled with said terminal means for transducing electrical variations peculiar to color type television signals only during reception of color type television signals; visual signal reproducing means operatively coupled with both of said channel means for conditionally reproducing either a visual monochrome television image display or a color television image display; a direct current control signal responsive means operatively coupled with said second signal processing channel for disabling said second channel means during periods other than those in which color television type signals are being received as defined hereinafter, said disabling means including a first amplifier having direct current signal response and provided with an input circuit and an output circuit; color burst separating means electrically coupled with said terminal means for separating said burst component from standard color television signals during reception thereof; means coupled with said last-named means for developing a direct current control voltage, the magnitude of which is a function of the amplitude of received burst component; a second amplifier having a direct current signal response for controlling said disabling means and having an input circuit and an output circuit; direct current signal coupling means connected between said control voltage developing means and said second amplifier input circuit for applying control signal thereto; a direct current signal coupling means connected between said second amplifier output circuit and said first amplifier input circuit, said coupling means including means for applying amplified control signal as delivered by said second amplifier to said first amplifier with such electrical sense as to enable said second channel during the reception of color type television signals; and direct current signal coupling means connected between the output circuit of said first amplifier and the input circuit of said second amplifier such to establish a degree of positive feedback between said first and second amplifiers whereby to minimize the periods required to enable and disable said second signal channel in response to the respective reception of color type television signals and monochrome television signals.

4. In a television receiver capable of receiving and transducing monochrome type television signals into monochrome television images or standard color television type signals into color television images, said color television signals including a periodic color synchronizing burst component, the combination of: a terminal means for accepting television signals of either type described; means electrically coupled with said terminal means for developing a direct current control voltage representing the amplitude of received burst component; a first signal processing channel means coupled with said terminal means for transducing both color type and monochrome type television signals; a second signal processing channel means coupled with said terminal means for transducing electrical variations peculiar to color type television signals only during reception of color type television signals; visual signal reproducing means operatively coupled with both of said channel means for conditionally reproducing either a visual monochrome television image display or a color television image display; a direct current control signal responsive means operatively coupled with said second signal processing channel for disabling said second channel means during periods other than those in which color television type signals are being received as defined hereinafter, said disabling means including an amplifier having direct current signal response and provided with an input circuit and an output circuit; direct current signal coupling means connected between said control voltage developing means and said amplifier input circuit for applying said control voltage thereto with such electrical sense as to enable said second channel only during the reception of color type television signals; and direct current responsive positive feedback means coupled between the output circuit and input circuit of said amplifier to establish a degree of positive feedback in said amplifier which reduces the time interval required to enable and disable said second signal channel in respective response to the reception of color type and monochrome type television signals.

References Cited in the file of this patent

UNITED STATES PATENTS

| | | |
|---|---|---|
| 2,141,343 | Campbell | Dec. 27, 1938 |
| 2,261,643 | Brown | Nov. 4, 1941 |
| 2,271,915 | Belleville | Feb. 3, 1942 |
| 2,277,000 | Bingley | Mar. 17, 1942 |
| 2,545,325 | Weimer | Mar. 13, 1951 |
| 2,545,420 | Sziklai | Mar. 13, 1951 |
| 2,596,138 | Feiner et al. | May 13, 1952 |

OTHER REFERENCES

Figure 14.22 and pages 516–517 of vol. 19 (Waveforms), Radiation Lab. Series, McGraw-Hill Publishing Co., published 1949.